United States Patent
Love et al.

(10) Patent No.: US 6,556,433 B1
(45) Date of Patent: Apr. 29, 2003

(54) FRICTION FASTENER AND METHOD FOR COMPUTER COMPONENTS

(75) Inventors: John S. Love, Sioux City, IA (US); Paul Holder, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 105 days.

(21) Appl. No.: 09/836,493

(22) Filed: Apr. 17, 2001

(51) Int. Cl.[7] .............................. H05K 7/12; H05K 5/02
(52) U.S. Cl. ...................... 361/685; 361/686; 361/732; 361/747; 312/223.2
(58) Field of Search ................................ 361/683–686, 361/727, 728, 729–732, 747; 312/223.1, 223.2, 330.1, 333

(56) References Cited

U.S. PATENT DOCUMENTS

| | | | |
|---|---|---|---|
| 3,948,477 A | | 4/1976 | Lample .......................... 251/8 |
| 4,215,908 A | | 8/1980 | Cherry et al. .................. 339/96 |
| 4,650,226 A | | 3/1987 | Babbitt et al. ............... 285/348 |
| 4,749,164 A | * | 6/1988 | Leo et al. ..................... 248/27.3 |
| 4,833,554 A | * | 5/1989 | Dalziel et al. ................. 360/69 |
| 4,896,777 A | * | 1/1990 | Lewis ............................ 211/26 |
| 5,311,455 A | * | 5/1994 | Ho ............................... 361/685 |
| 5,335,892 A | | 8/1994 | Busch ......................... 248/551 |
| 5,410,781 A | | 5/1995 | Anjos et al. ............... 24/274 R |
| 5,548,480 A | * | 8/1996 | Rudi et al. ................... 248/581 |
| 5,564,804 A | * | 10/1996 | Gonzalez et al. ......... 312/223.2 |
| 5,566,383 A | * | 10/1996 | Gildea et al. ............... 361/685 |
| 5,717,571 A | * | 2/1998 | Helot ........................... 361/685 |
| 5,761,774 A | | 6/1998 | Champi ..................... 24/274 R |
| 5,812,370 A | * | 9/1998 | Moore et al. ................ 361/684 |
| 5,818,689 A | * | 10/1998 | Johns et al. ................. 361/685 |
| 5,822,151 A | | 10/1998 | Albrecht et al. .......... 360/98.08 |
| 5,855,177 A | | 1/1999 | Nakayama et al. .......... 112/235 |
| 6,040,980 A | * | 3/2000 | Johnson ....................... 312/333 |
| 6,049,963 A | * | 4/2000 | Boe .............................. 24/563 |
| 6,053,670 A | | 4/2000 | Schmid ......................... 407/34 |
| 6,119,992 A | | 9/2000 | Stuart .................... 248/231.71 |
| 6,377,448 B1 | * | 4/2002 | Liu et al. ..................... 361/685 |

FOREIGN PATENT DOCUMENTS

JP            2001-15942 A    *   1/2002            H05K/5/02

* cited by examiner

Primary Examiner—Anatoly Vortman
(74) Attorney, Agent, or Firm—Scott Charles Richardson; Bradley A. Forrest; Schwegman, Lundberg, Woessner & Kluth

(57) ABSTRACT

A computer having one or more components is assembled utilizing a friction fastener that is formed by use of a screw that bears on a surface attached to a cage adjacent a component to create a friction fit to retain the component in a secure manner within the cage in the computer. The surface is a substantially flat portion of a shim or finger tab that is attached to the cage. The surface fits into an opening in the cage having a backed-off portion screw support having a threaded opening opposite the surface from the component. The screw is installed in the screw support to provide force against the surface of the tab to press it into the component in a friction fit manner to prevent movement of the component relative to the cage.

23 Claims, 5 Drawing Sheets

FRICTION FASTENER AND METHOD FOR COMPUTER COMPONENTS

FIELD OF THE INVENTION

The present invention relates to fasteners for computer components, and in particular to a friction faster for computer components.

BACKGROUND OF THE INVENTION

Assembly of computers, such as personal computers can be a difficult endeavor. Many components, such as disk drives are fastened into personal computer cabinets. Such components are commonly screwed into component cages that are attached to structures attached to a base of the personal computer. The cages have openings that mate with threaded openings formed in the components for attachment to the cages by use of screws. The use of one or more screws, which intrude into the components, requires a precision location of the mating openings, and also creates the possibility for damage to components by intrusion of the threaded end of the screws. Further, the assembly of the cages and components usually requires the use of more than one screw, which slows assembly and disassembly.

There is a need for a way of securely assembling and disassembling computer components in a computer system in a faster and simpler manner. There is a further need for such a way that minimizes risk of damage to such components.

SUMMARY OF THE INVENTION

A tension fastener bears on a shim or tab surface to create a friction fit to retain a component in a secure manner within a cage or other holding device. In one embodiment, a screw is used to provide tension on the surface that is coupled to the cage. The surface presses on the component, such as a disk drive to hold the disk drive in place.

In a further embodiment, the surface is a substantially flat portion of a shim or finger tab that is attached to the cage. The finger tab may be attached by spot welding, adhesive or other available method of attaching a tab to a cage. The surface fits into an opening in the cage having a backed-off portion such as a screw support having a threaded opening opposite the surface from the component. A screw or other type of tension or compression fastener uses the screw support to provide force against the surface of the tab to press it into the component in a friction fit manner to prevent movement of the component relative to the cage. The surface may also be textured, rubberized or coated with a rubber or similar material to provide additional static friction. In one embodiment, an end of the screw opposite the head is substantially flat. In further embodiments the length of the screw is limited to a length such that when the screw is fully engaged with the screw support, the surface of the tab is sufficiently engaged to provide adequate retentive force on the component, but not so far as to cause undesired damage to the component or tab.

In a further embodiment, the finger tab is formed of a material, such as steel, that has a spring constant that allows the tab to be backed off the component to allow the component to be easily removed from the cage. It is also formed rigid enough not to significantly deform or mar the component when providing sufficient retaining friction.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

A standard personal computer system is first described, followed by description of a system for fastening components in the computer system for ease of assembly and disassembly.

Figure 2:
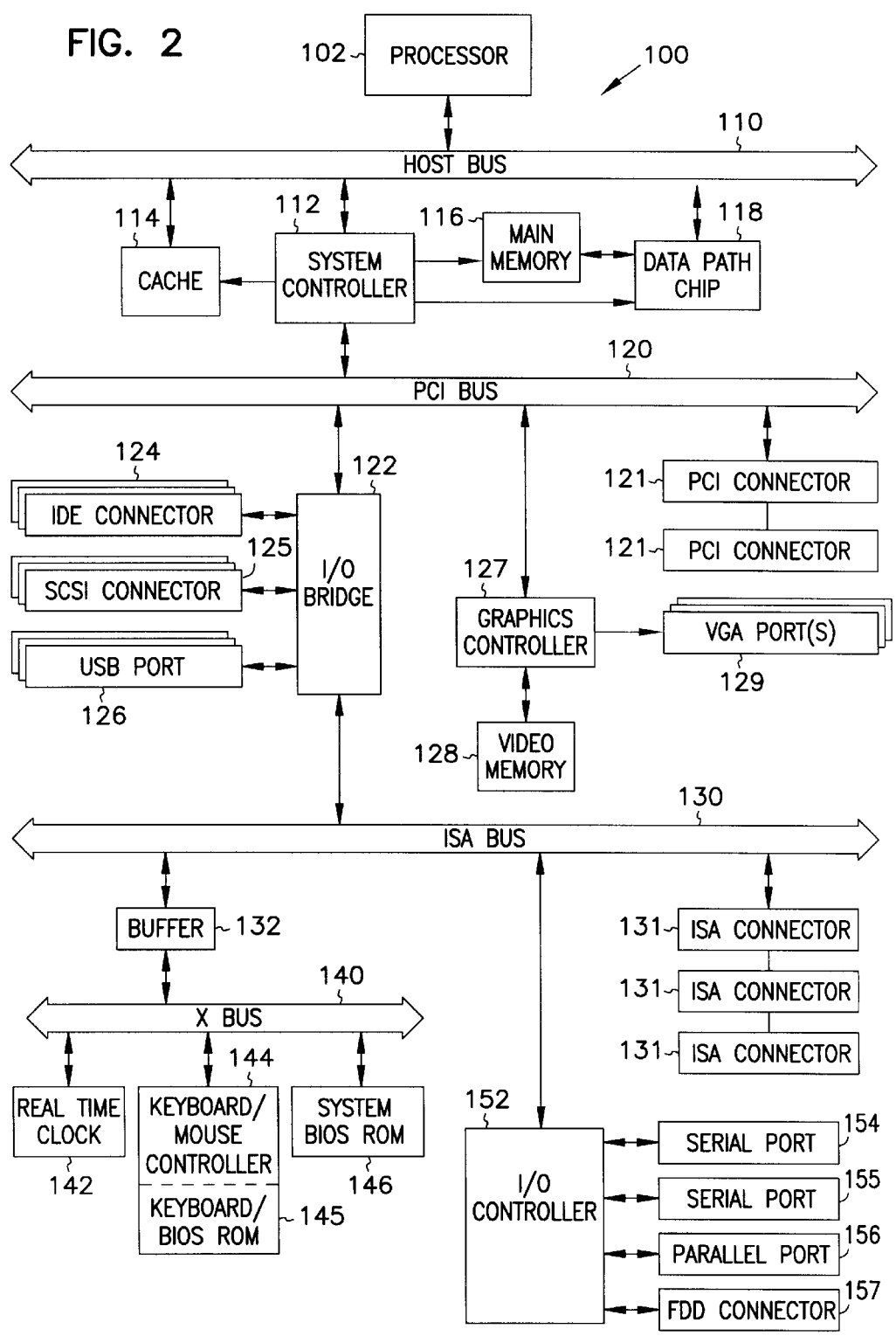
FIG. 2 is a block diagram of a computer system incorporating the fastener of the present invention.

FIG. 2 shows a block diagram of a personal computer system 100 according to the present invention. In this embodiment, a processor 102, a system controller 112, a cache 114, and a data-path chip 118 are each coupled to a host bus 110. Processor 102 is a microprocessor such as a 486-type chip, a Pentium®, Pentium® II, Pentium® III, Pentium® 4, or other suitable microprocessor. Cache 114 provides high-speed local-memory data (in one embodiment, for example, 512 kB of data) for processor 102, and is controlled by system controller 112, which loads cache 114 with data that is expected to be used soon after the data is placed in cache 112 (i.e., in the near future). Main memory 116 is coupled between system controller 114 and data-path chip 118, and in one embodiment, provides random-access memory of between 16 MB and 256 MB or more of data. In one embodiment, main memory 116 is provided on SIMMs (Single In-line Memory Modules), while in another embodiment, main memory 116 is provided on DIMMs (Dual In-line Memory Modules), each of which plugs into suitable sockets provided on a motherboard holding many of the other components shown in FIG. 2. Main memory 116 includes standard DRAM (Dynamic Random-Access Memory), EDO (Extended Data Out) DRAM, SDRAM (Synchronous DRAM), or other suitable memory technology. System controller 112 controls PCI (Peripheral Component Interconnect) bus 120, a local bus for system 100 that provides a high-speed data path between processor 102 and various peripheral devices, such as graphics devices, storage drives, network cabling, etc. Data-path chip 118 is also controlled by system controller 112 to assist in routing data between main memory 116, host bus 110, and PCI bus 120.

In one embodiment, PCI bus 120 provides a 32-bit-wide data path that runs at 33 MHz. In another embodiment, PCI bus 120 provides a 64-bit-wide data path that runs at 33 MHz. In yet other embodiments, PCI bus 120 provides 32-bit-wide or 64-bit-wide data paths that run at higher speeds. In one embodiment, PCI bus 120 provides connectivity to I/O bridge 122, graphics controller 127, and one or more PCI connectors 121 (i.e., sockets into which a card edge may be inserted), each of which accepts a standard PCI card. In one embodiment, I/O bridge 122 and graphics controller 127 are each integrated on the motherboard along with system controller 112, in order to avoid a board-connector-board signal-crossing interface and thus provide better speed and reliability. In the embodiment shown, graphics controller 127 is coupled to a video memory 128 (that includes memory such as DRAM, EDO DRAM, SDRAM, or VRAM (Video Random-Access Memory)), and drives VGA (Video Graphics Adaptor) port 129. VGA port 129 can connect to industry-standard monitors such as VGA-type, SVGA (Super VGA)-type, XGA-type (eXtended Graphics Adaptor) or SXGA-type (Super XGA) display devices. Other input/output (I/O) cards having a PCI interface can be plugged into PCI connectors 121.

In one embodiment, I/O bridge 122 is a chip that provides connection and control to one or more independent IDE or SCSI connectors 124–125, to a USB (Universal Serial Bus) port 126, and to ISA (Industry Standard Architecture) bus 130. In this embodiment, IDE connector 124 provides connectivity for up to two standard IDE-type devices such as hard disk drives, CDROM (Compact Disk-Read-Only Memory) drives, DVD (Digital Video Disk) drives, video-cassette recorders, or TBU (Tape-Backup Unit) devices. In one similar embodiment, two IDE connectors 124 are provided, and each provide the EIDE (Enhanced IDE) architecture. In the embodiment shown, SCSI (Small Computer System Interface) connector 125 provides connectivity for up to seven or fifteen SCSI-type devices (depending on the version of SCSI supported by the embodiment). In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

The computer system of FIG. 2 has many connectors for attaching components such as disk drives, floppy disk drives, CDROM drives, DVD drives, tape drives, and other compatible components. These components must be secured within a housing of the computer system in a manner that makes them easy to assemble and disassemble for maintenance or upgrading.

Figure 1:
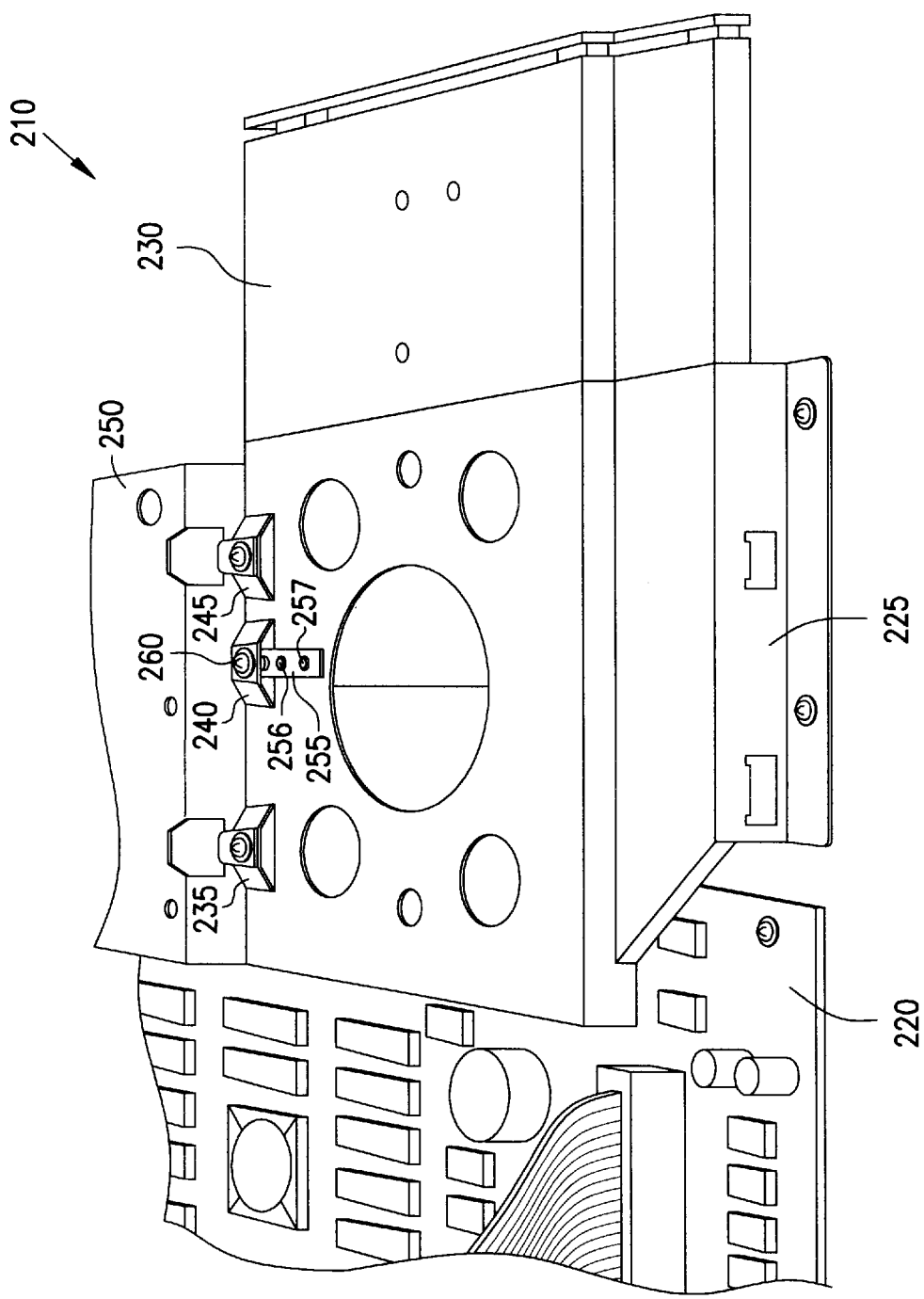
FIG. 1 is a block diagram of a computer system showing a fastener coupled to a cage for securely holding a component being inserted into a cage.

FIG. 1 shows a computer system base 210 supporting a system board 220. System board 220 normally contains processor 102, host bus 110, cache 114, system controller 112, main memory 116 and many other elements of the computer system 100 as desired. Larger components are attached by the use of one or more cages 225 which are coupled to the base 210 or other components mounted on the base by the use of multiple screws. The cage 225 is formed of sheet metal that has been formed to mate with a component, such as disk drive 230 when fully inserted in the cage. As shown in FIG. 1, the disk drive is only partially inserted into cage 225.

Cage 225 has several screw supports punched out, as indicated at 235, 240, and 245. The screw supports are threaded to provide attachment points to a power supply or other device secured to the base by the use of one or more screws. Screw support 240 is backed off from the cage 225, and a shim or finger tab 255 is inserted between the screw support and the drive 230. The finger tab 255 is attached to the cage 225 by means of one or more spot welds 256, 257 or by an other suitable means, such as adhesive. A tensioning device, such as screw 260 is coupled via the screw support to provide a variable force on a portion of the finger tab 255 that is substantially flat with respect to a surface of the drive 230. The screw 260 is backed off to allow insertion of the disk drive 230 without significant interference from tab 255 as shown in FIG. 1. In further embodiments, shims, wedges, clamps and/or leaf springs are used to provide tension. Further devices which provide such tension may also be used. The invention is intended to encompass both equivalent structures and structural equivalents without providing substantial change to the invention.

Figure 3:
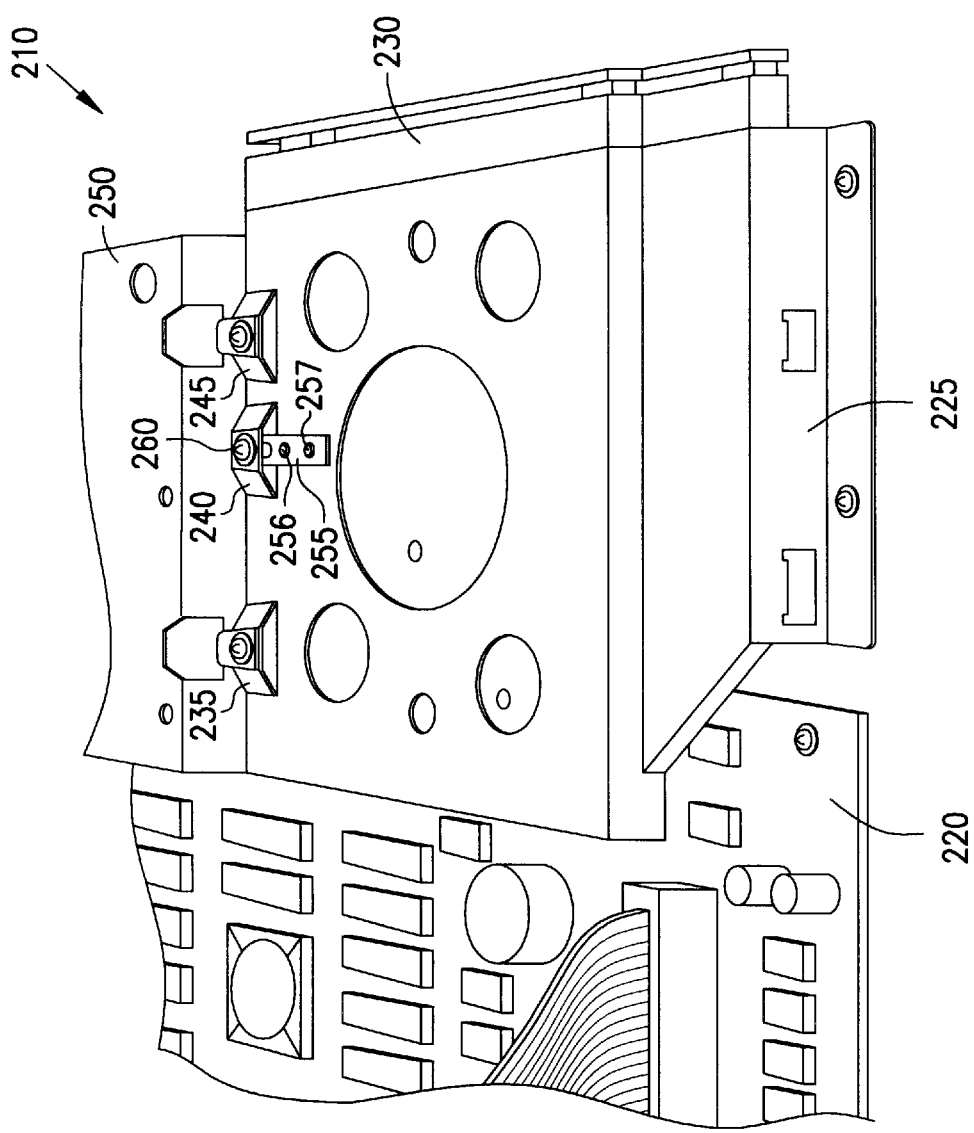
FIG. 3 is a block diagram of the computer system of FIG. 1 showing a fastener coupled to a cage for securely holding a component shown as fully inserted into a cage in the computer system of FIG. 1.

Once the component is fully inserted while the screw 260 is backed off, the screw 260 is tightened as shown in FIG. 3, wherein the numbering is consistent with FIG. 1, to provide suitable retentive force on the disk drive 230 to keep it in place relative to the cage. To remove the drive 230, the screw 260 is again backed off to reduce or eliminate the friction force provided between the substantially flat portion of the tab 255 and the drive 230. In one embodiment, the amount of distance that the screw support is backed off, the length of the screw 260, and the thickness of the tab 255 are such that a fully engaged screw 260 provides sufficient pressure on the tab to generate a desired amount of retentive-friction between the tab and the drive without damaging the tab or drive. Such a combination is said to provide length controlled tensioning. Otherwise, the manufacturing process can be designed around providing a range of torque to be applied to the screw to obtain the same result.

In one embodiment, the tab 255 is formed of mild steel or stainless steel, and is of a thickness that provides a spring constant sufficient to enable the tab 255 to be moved by the tensioning device between suitable friction contact and backed off of the drive to permit easy removal and replacement of the drive without damaging the drive. The tab 255 should also be thick enough to prevent damage to the tab itself despite repeated tensioning and untensioning. Other materials for the tab 255 exhibiting similar properties will be apparent to those skilled in the art, including but not limited to various metals, such as copper, aluminum, tin, steel, and nylon, plastic, high impact plastic, vinyl, carbon laminates, graphite. While these are desired properties of the tab 255, they are not required to practice the invention.

The tensioning device is the combination of the screw 260 and the screw support 240 in one embodiment. Any other type of tensioning arrangement that provides a desired amount of force on the tab may be used, such as wedges, jacks or spring type devices.

Figure 4:
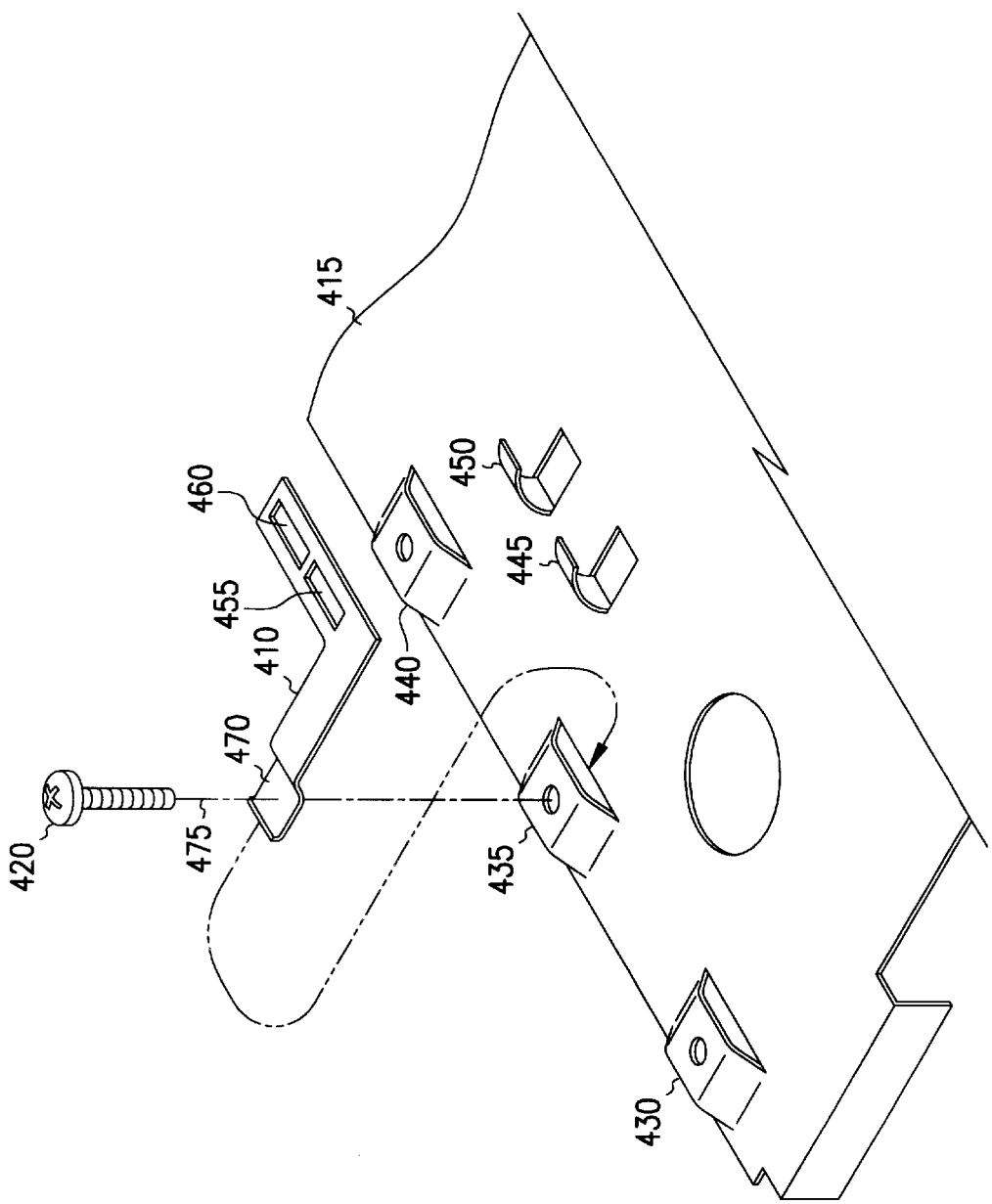
FIG. 4 is a block diagram of an alternative fastener coupled to a cage for securely holding a component.

FIG. 4 provides a more detailed diagram of a finger tab 410 used in combination with a cage 415 and tensioning screw 420. The cage 415 has punched out screw supports 430, 435, and 440 offset from the plane of the cage in order to both secure the cage to another structure, supports 430 and 440, and to provide support at 435 for the tensioning screw 420. Support 435 is positioned near an edge of the cage 415 and correspondingly proximate or as near to the edge of an inserted component as practical in order to take advantage of structural rigidity provided by side walls of both. In a further embodiment, support 435 is positioned near a corner of the cage and corresponding inserted component to take advantage of yet further structural rigidity provided by multiple side walls.

Cage 415 has a pair of punched out retaining tabs 445 and 450. Finger tab 410 is L shaped and has a pair of slots 455 and 460 for mating with retaining tabs 445 and 450 respectively in the lower part of the L shape. Finger tab 410 may also be attached to the cage by other means as previously described, and is not limited to the number of holes, and need not be in a shape such as the L-shaped bracket as shown. A straight shape, a T-shape, or other shapes of tabs may also be used. In yet a further embodiment, a finger tab 410 is formed by a partial punch-out of the cage material.

The slots and retaining tabs essentially provide for registration of the finger tab 410, and in particular provide a means of positioning a substantially flat portion 470 of the finger tab 410 adjacent to a fully inserted component in the cage such that the screw 420 may force it into frictional contact with the component. Such contact provides sufficient retentive force on the finger tab itself such that further fastening of it to the cage is not required. The substantially flat portion 470 of the finger tab 410 is formed to fit within the space created under the screw support 435, and be flexed by the screw 420 into friction contact with the component. The flat portion may be textured, such as by a cross hatching, or alternatively coated with a material, such as rubber to provide a higher amount of static friction with the same or less force applied. This would further serve to minimize distortion of the component in response to the pressure applied to component through flat portion 470. While flat portion 470 is described as substantially flat, it should be recognized that a flat portion is not required, and that other surface contours providing sufficient static friction on the component without significantly marring or distorting the component may also be used, such as a mildly curving contour. Further, when a flat surface is used, it should be offset from the rest of the tab 410 in a manner so that it is substantially parallel to the component when engaged with the component.

Screw 420 is a common screw having a substantially flat end 475 opposite the head of the screw. The head of the screw may be shaped to utilize any type of driving implement, such as a Phillips head, slotted head or hex head. A flat end 475 distributes force more evenly over a wider surface of the portion 470 of finger tab 410. A slightly rounded end may also be used in conjunction with an optionally thicker finger tab that will provide sufficient static friction without significant distortion. Such a screw may utilize a lower torque to obtain desired or predetermined levels of static friction. Further, a thumb screw used in one embodiment, which may easily be operated by hand without requiring a tool to drive the screw.

Figure 5:
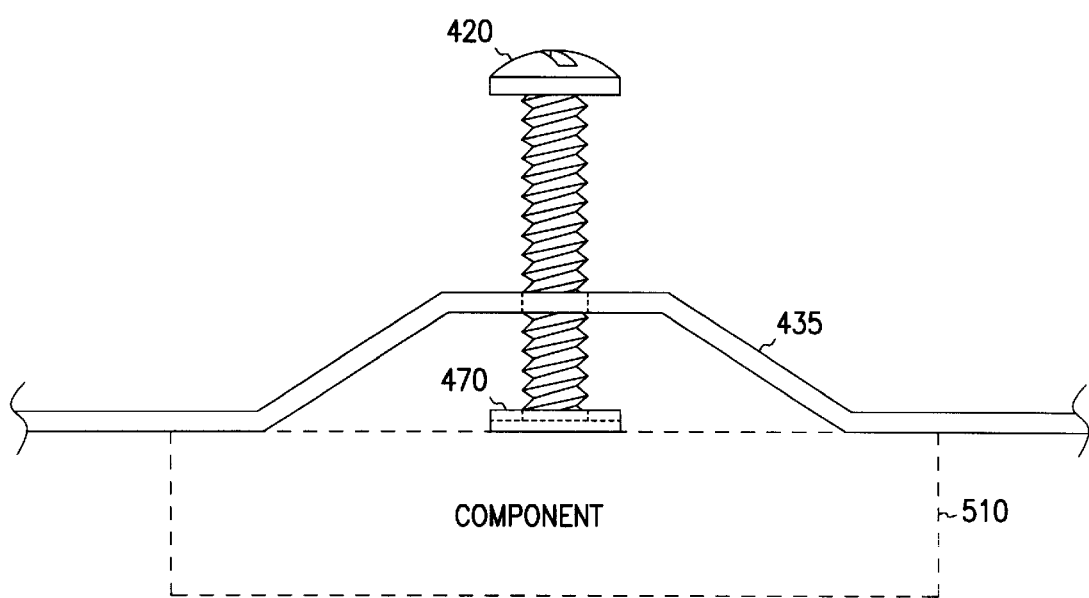
FIG. 5 is a block partial side elevation of the fastener of FIG. 4 when a component is fully installed.

FIG. 5 is a partial side elevation of the friction fastener of FIG. 4 and further including a component 510. The support 435, tensioning screw 420 and flat portion 470 of the tab 410 are shown in further detail. The component 510 is shown fully inserted and retained in place by the friction fastener. The tensioning screw 420 is fully tightened to press the flat portion 470 of the tab 410 into retentive contact with the component 510.

In one embodiment, the component is inserted prior to insertion of the screw 420. Once the component is fully inserted, the screw 420 is inserted into the support 435 and tightened to provide desired retentive force. In a further embodiment, the screw 420 is partially inserted into the support and not fully tightened to facilitate easy insertion and removal of the component 510. Upon insertion of the component 510, the screw is then tightened.

A friction fastener is formed by use of a screw that bears on a surface adjacent a component to create a friction fit to retain the component in a secure manner within a cage or other holding device. In one embodiment, the surface is a substantially flat portion of a shim or finger tab that is attached to the cage. The surface fits into an opening in the cage having a backed-off portion screw support having a threaded opening opposite the surface from the component. The screw is installed in the screw support to provide force against the surface of the tab to press it into the component in a friction fit manner to prevent movement of the component relative to the cage.

Retention of the component, such as a disk drive is accomplished without need for any type of modification of the component. The invention provides for the secure retention of a component in a component cage without requiring fastener holes in the component and without causing a fastener to penetrate into the interior of the component. Further, the component may be retained in place without the use of multiple screws, speeding final assembly and disassembly for repair or upgrade. If desired, more than one friction fastener may be utilized to hold the component in place, again without a required modification of the component.

What is claimed is:

1. A computer system having a component installed therein, the system comprising:
   a base;
   a cage coupled to the base for holding the component;
   a tab coupled to the cage; and
   a tensioning device coupled to the cage that forces a portion of the tab into static friction contact with the component;
   wherein the tensioning device comprises a screw support and a screw coupled to the screw support for providing the force on the tab.

2. The computer system of claim 1, wherein the screw has a first end for applying torque, and a second end for contacting a substantially flat portion of the tab.

3. The computer system of claim 2, wherein the substantially flat portion of the tab is positioned between the screw support and the component.

4. The computer system of claim 1, wherein the tab has a substantially flat portion that contacts the component when the screw is engaged.

5. The computer system of claim 1, wherein the tab has a portion with texturing to increase its coefficient of friction.

6. The computer system of claim 1, wherein the screw support is offset from the cage such that when the screw is fully engaged with the screw support, sufficiently retentive friction is provided on the component without significant damage to the component.

7. The computer system of claim 1, wherein the screw support is positioned proximate an edge of the component when the component is inserted into the cage.

8. The computer system of claim 1, wherein the screw support is positioned proximate two edges of the component when the component is inserted into the cage.

9. The computer system of claim 1, wherein the tab is spot welded to the cage.

10. The computer system of claim 1, wherein the tab is formed of steel.

11. The computer system of claim 1 wherein the tab is rubberized.

12. The computer system of claim 1, wherein the tab has spring constant to allow deformation during disassembly.

13. The computer system of claim 1 wherein the tensioning device comprises a screw that does not penetrate an exterior surface of the component.

14. A drive mounting system for supporting a drive within a computer system, the mounting system comprising:
- a cage shaped to accommodate a component;
- a tensioning device support coupled to the cage;
- a tab coupled to the cage; and
- a tensioning device operably coupled to the tensioning device support for forcing the tab into friction contact with the drive wherein the tensioning device comprises a screw support and a screw coupled to the screw support for providing the force on the tab.

15. The drive mounting system of claim 14, wherein the screw has a first end for applying torque, and a second end for contacting the tab.

16. The drive mounting system of claim 14, wherein the tab has a portion with texturing to increase its coefficient of friction.

17. The drive mounting system of claim 14, wherein the tab is rubberized.

18. The drive mounting system of claim 14, wherein the screw support is offset from the cage such that when the screw is filly engaged with the screw support, sufficiently retentive friction is provided on the component without significant damage to the component.

19. The drive mounting system of claim 14, wherein the tab is spot welded to the cage.

20. The drive mounting system of claim 14, wherein the tensioning device comprises a screw that does not penetrate an exterior surface of the component.

21. A method of installing a component into a computer, the method comprising:
- inserting the component into a cage; and
- activating a tensioning device to create friction contact with the component of sufficient force to retain the component in the cage;
- wherein activating the tensioning device comprises tightening a screw to force a portion of a tab secured to the cage into friction contact with the component.

22. The method of claim 21, wherein the screw is first inserted into a screw support coupled to the cage.

23. The method of claim 21, wherein the tab is inserted between the screw support and the component prior to activation of the tensioning device.

\* \* \* \* \*